United States Patent [19]

Smith

[11] Patent Number: 4,475,175

[45] Date of Patent: Oct. 2, 1984

[54] COMPUTER COMMUNICATIONS CONTROL

[75] Inventor: James G. Smith, Laurel, Canada

[73] Assignee: Exide Electronics Corporation, Philadelphia, Pa.

[21] Appl. No.: 344,205

[22] Filed: Jan. 29, 1982

[30] Foreign Application Priority Data

Jun. 5, 1981 [CA] Canada ................................ 379171

[51] Int. Cl.³ .......................... G06F 3/00; H04L 9/00
[52] U.S. Cl. ................................ 364/900; 178/22.08; 178/22.09
[58] Field of Search ............... 178/22.01, 22.08, 22.09; 364/200 MS File, 900 MS File

[56] References Cited

U.S. PATENT DOCUMENTS

| | | | |
|---|---|---|---|
| 3,761,883 | 9/1973 | Alverez et al. | 340/172.5 |
| 3,798,605 | 3/1974 | Feistel | 340/172.5 |
| 3,956,615 | 5/1976 | Anderson et al. | 178/22.08 |
| 3,958,081 | 5/1979 | Ehrsam et al. | 172/22 |
| 3,962,539 | 6/1976 | Ehrsam et al. | 178/22 |
| 4,128,874 | 12/1978 | Pertl et al. | 364/200 |
| 4,188,664 | 2/1980 | De Shon | 364/200 |
| 4,195,351 | 3/1980 | Barner et al. | 364/900 |
| 4,218,738 | 8/1980 | Matyas et al. | 364/200 |
| 4,218,740 | 8/1980 | Bennett et al. | 364/200 |
| 4,271,482 | 6/1981 | Giraud | 364/900 |
| 4,281,216 | 7/1981 | Hogg et al. | 178/22.08 |
| 4,295,039 | 10/1981 | Stuckert | 364/900 |
| 4,310,720 | 1/1982 | Check, Jr. | 178/22.08 |
| 4,310,896 | 1/1982 | Cutler et al. | 364/900 |
| 4,317,957 | 3/1982 | Sendrow | 178/22.08 |
| 4,349,695 | 9/1982 | Morgan et al. | 178/22.08 |

*Primary Examiner*—Jerry Smith
*Assistant Examiner*—Gary V. Harkcom
*Attorney, Agent, or Firm*—Eugene Chovanes

[57] ABSTRACT

A secure communication link is provided for transmitting signals between a host computer and at least one authorized terminal. The communication link includes a host modem for modulating and demodulating the signals transmitted between the host computer and the authorized terminal and an access controller. The access controller stores enquiry and reply sequences of bits and is operable to compare incoming signals from the host modem with the stored sequences of bits. Where there is agreement between the signals from the host modem and the stored sequences of bits, the controller establishes the communication link. Where there is no agreement or no reply from the host modem, the controller disconnects the host modem from the link.

3 Claims, 2 Drawing Figures

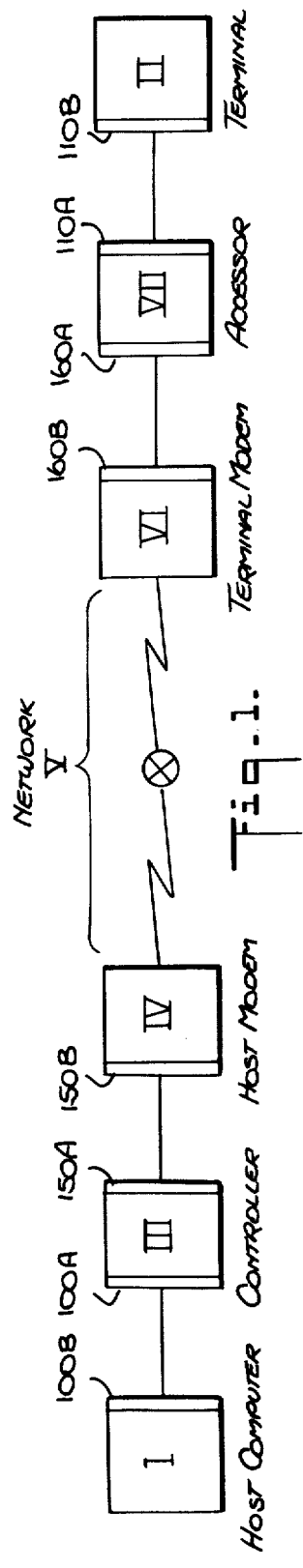
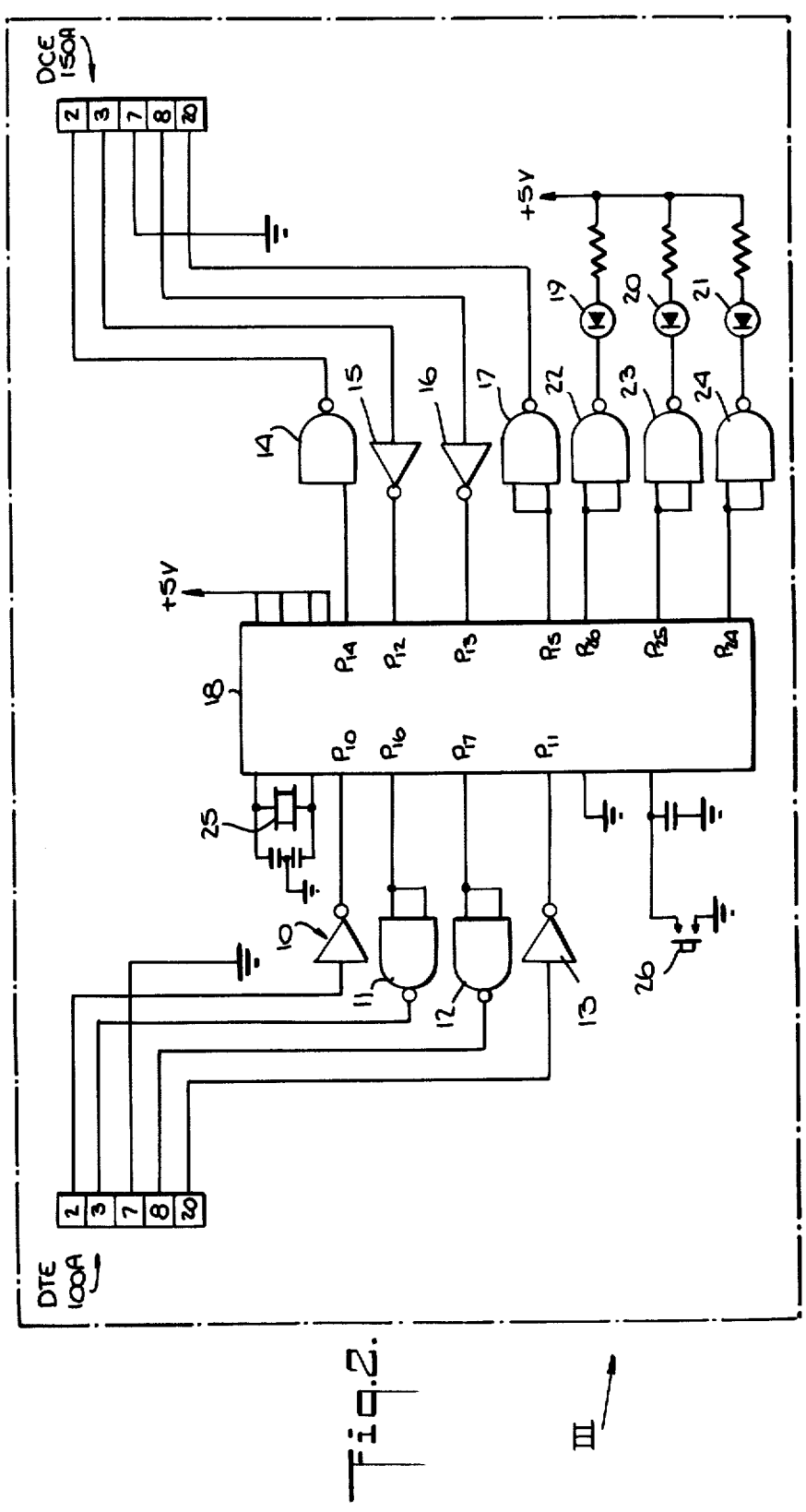

COMPUTER COMMUNICATIONS CONTROL

BACKGROUND OF THE INVENTION

The present invention relates to access control within data processing environments and more particularly to access control apparatus whereby telephone "dial" and other electronic access into a computer is restricted to a predeterminable and physically controllable set of terminal apparatus.

BRIEF DESCRIPTION OF THE PRIOR ART

In data processing environments (sometimes referred to as "systems"), control of access into the host computer is desirable, and often practically necessary, in order to ensure privacy of stored information, reduce risk of capricious or malicious manipulation, erasure or other damage of stored information, and also to reduce risk of theft of computing resources and assets, e.g., programs and "computer time". Heretofore, attempts have been made to control access into computers in data processing systems by means that restricted access to certain individuals (persons) who had been provided certain specific information, such as passwords. Although this type of approach of basing control on restriction of the number of persons who have password knowledge to achieve access is a reasonable and sometimes successful technique, it does not address problems of restricting the number of places from which access can be accomplished. And so it is that individuals with broad security knowledge and working capability for terminal and computer operation, such as systems programmers, are able to access into computer resources under improper or illegitimate circumstances, such as during late-hours from home-built terminals tapping into telecommunications facilities. And it is of course understood that as a practical matter, computer system security is a desirable ideal that may not be completely 100% attainable and even if nearly attainable, perhaps by highly sophisticated means, e.g., special cryptographic apparatus, the expense is still of major consideration. An important ingredient in the computer security problem is providing useful tight security with relatively low-cost, commercially producible and operable apparatus that is not unsatisfactorily vulnerable to circumvention or duplication by readily available means.

SUMMARY OF THE INVENTION

There has now been discovered a new means of protecting information in data processing environments.

An object of the invention is to provide new apparatus for restricting electronic access into a computer in a data processing system.

BRIEF DESCRIPTION OF THE FIGURES

Other objects and benefits of the invention are apparent from the following description and accompanying drawing wherein:

FIG. 1 depicts a data processing system incorporating security apparatus of the invention; and FIG. 2 portrays a schematic diagram for security locking apparatus of the invention.

DETAILED DESCRIPTION

The present invention contemplates electronic circuit apparatus for generally refusing electronic entry into the host computer of a computer-terminal data processing system and for subsequently providing an entry path only upon being furnished certain electronic information demonstrating a request for entry to be coming from a known terminal that is an authorized member of the system. The access control apparatus at the host site serves, and may be referred to, as a "lock", and yet, it has the advantage of being a lock in the negative sense of being a void that does not provide an entry path, and thus is not dependent on maintaining a barrier (which might be breakable). The access controller, functioning between the host and the modem link to a switched-carrier network, monitors incoming signals, requests replies, examines replies and discriminates among replies and then serves to activate disconnect circuitry and entry path circuitry according to propriety of replies. Also, the apparatus has reset circuitry for electronically returning to the normal wait state after communications are terminated. Upon detecting that a connection has been established over a carrier network, e.g., a telecommunications facility, the lock unit issues an enquiry sequence of bits to the remote end of the line and waits for a reply message. If no reply arrives within a predetermined time, the modem link is disconnected. And, in the event that a response is received and fails to qualify as a proper reply from a member terminal, the lock unit sends a signal to the host modem to disconnect the network link. And, alternatively, in the event of finding that a proper response has been received, thus demonstrating the source to be an authorized member terminal of the system, then the lock activates a transfer of subsequently received signals to the computer input position and also provides for transferring computer output signals to the linking modem, thus providing access with the member terminal. For recognition by the lock, member terminals are specially provided with response apparatus capable of transmitting specialized confidential code signals complying with a preset specialized sequence stored in a ROM (read only memory) in the locking apparatus—the controller. Thus, analogously, digital code signal keys are transmitted from member terminal to computer lock. And inasmuch as computer access can be restricted to only those terminals having corresponding key transmitters, access control can be facilitated by physically guarding against unauthorized operation of the keyed terminals. Yet, when the transfer path has been engaged by reception of the key signal sequence, then the lock and key units pass both control and data signals between terminal and computer without change, just as if both devices (lock and key) did not exist.

The key unit has memory and comparator circuitry for storing and examining security code information and responding to proper inquiries. ROM types are advantageous for safeguarding against tampering. However, where desired, Read/Write types, e.g., EPROM, can be used to enable accomplishing authorized changes, such as updating, by electronic control from a remote facility, possibly the host computer.

Turning now to the drawing, FIG. 1 depicts secured data processing system SDPS arranged for enabling telecommunication between host computer I and member terminal II through host access-control unit (or device) III, host modem IV, switced-carrier network V, terminal modem VI and terminal access-control device VII. Unit III is joined communicatively to computer I with multipin DTE (data transmitting element) connections 100A&B, and unit VII is joined to terminal II with DTE, connectors (110A&B), as shown in FIG. 1. Also, unit III is joined to modem IV with multipin DCE (data communication element) connectors 150A&B, and unit VII is joined to modem VI with multipin DCE connectors 160A&B; cables lead between connector pairs. The connectors can be commercially available standard types, e.g., RS-232.

FIG. 2 schematically depicts circuitry of access controller III with leads to pins of DCE connector 150A and DTE connector 100A. The signals which are to be used or altered are converted to appropriate representations by level converters 10, 11, 12, 13, 14, 15, 16 and 17 functioning in communication paths to and from central logic unit (CLU) 18 and connectors 100A and 150A. Essential charge storage elements in which are placed the representative sequence bit codes that correspond, in analogy, to the notches in a key and the pins in a lock, and control circuitry for directing output signals to connectors 100A and 150A, and also auxiliary circuits to visual indicators, e.g., colored lights 19, 20 and 21 via power buffers 22, 23 and 24 are contained in CLU 18. Commercially available microcomputers installed in the access controller can perform the functions required of the CLU component in access controllers of the invention. For example CLU 18 is an INTEL 8748 single-chip computer with oscillator crystal 25 for timing and I/O ports as indicated by P-numbers. Functioning of controller III can be manually overridden by operation of reset switch 26, which resets the controller to the normal wait state of holding alert for reception of signals indicating incoming request for entry into the computer.

In operation, messages dialed or otherwise addressed to the host are processed from carrier network V thru modem IV and transmitted to access controller III at pin 8 on DCE connector 150A. Thus, reception at the host controller of a signal via DCE150A pin 8 through level converter 16 indicates that a communication link has been established. A host enquiry sequence of bits is then sent from CLU 18 to DCE150A pin 2 via level converter 14. This sequence of bits is then transmitted over switched-carrier network V, with modulate/demodulate processing appropriately in modems IV and VI, to remotely located terminal II. The bit sequence is coded to elicit a response from controller VII but not from any standard terminal apparatus. Moreover, it is desirable that the enquiry sequence be sufficiently specialized to avoid triggering responses from any other known apparatus that may be in communication with the network.

After transmitting its enquiry sequence, the circuitry in CLU 18 switches to the receive state to monitor any incoming signals on DCE150A pin 3 via level converter 15. Any signals so received are then examined in comparison to an ROM built into CLU 18 to verify or deny the correctness of a bit sequence signaling proper response by terminal II.

For the present example, the bit sequence signals are in forms of predetermined but not necessarily fixed sequences of high and low voltage values occurring at predetermined but not necessarily fixed time intervals, e.g., sequences having 5 highs in the enquiry sequence and 31 highs in the response sequence at intervals varying in the range of 3.3 to 200 milliseconds. The memory is an MOS ROM in an INTEL 8748 microcomputer serving as CLU 18.

When a discrepancy occurs between response signals received and those expected in view of the memory stored in CLU 18, then a disconnect signal is issued by CLU 18 to DCE150A pin 30 via level converter 17. This disconnect signal shuts-off modem IV, e.g., applies a negative voltage to open a relay in the modem, thereby breaking the communications link and denying access to computer I.

Also, if no response is received within a predetermined wait period, e.g., 0.5 seconds, the disconnect signal breaks the communication link.

Alternatively, if the signal received in response is verified as proper, which occurs with proper correspondence to the code reply sequence stored in the CLU memory, then CLU 18 issues an "authorized link established" signal to DTE100A pin 8 via level converter 12. Subsequently, all signals thereafter received on DCE150A pin 3 are transferred to DTE100A pin 3 via CLU 18 and level converters 15 and 11. And also upon establishment of the authorized link, all computer output signals received on DTE100A pin 2 are transferred to DCE150A pin 2 via CLU 18 and level converters 10 and 14. In conjunction with this link establishment, CLU 18 provides visual indication of operational status by sending signals to light emitting diodes 19, 20 and 21 via power buffers 22, 23 and 24. Indicators 19, 20 and 21 show colors of red, yellow and green, thereby indicating status conditions of: (a) Non-secure; (b) Identity issued; and (c) Secure communication in progress.

For communication with the host, remote terminal II is joined to access control unit (accessor) VII with DTE connectors 110B and 110A having multiple pins numbered as on DTE connectors 100A and 100B. Accessor VII communicates with network V thru modem VI via DCE connectors 160A and 160B pins with numbers corresponding to pins on DCE150A and DCE150B. The remote accessor performs functions complementary to those of controller II and has corresponding components therefor, including a solid state microcomputer logic part referred to as CLU-TE (not shown). After sending a signal addressed to host computer I, and then upon detecting a signal on pin 8 of DCE160A, the logic component (CLU-TE) in the accessor switches into a receive state for monitoring signals on DCE160A pin 3. When, and provided that, the next received signals correspond to the host enquiry sequence, a duplicate of the stored reply sequence is sent in response by accessor VII. Then, as mentioned in describing operation of host controller III, reception of the proper reply from accessor VII results in issuance of an authorized-link-established signal to DTE100A pin 8 at the host site and, consequently, at both host and terminal sites the logic components switch so that signals received on DCE pin 3 are transferred to DTE pin 3 and signals received on DTE pin 2 are transferred to DCE pin 2, thereby providing two-way access for terminal and computer.

Similarly to the host controller, the accessor has light emitting diodes and power buffers for providing visual indications of status.

The present invention is particularly useful for avoiding establishment of undesirable electronic access into a host computer from an unauthorized terminal facility while yet providing for establishment of desired two-way communication between host and previously authorized terminal(s). Also, the invention is considered possibly useful for providing additional restricted "sign-on" capabilities.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

The embodiments of the invention in which an exclusive property or privilege is claimed are defined as follows:

1. Apparatus providing a secure communication link for transmitting signals between a host computer (I) and at least one authorized terminal (II), comprising
   (a) host modem means (IV) for modulating and demodulating the signals transmitted between the host computer and the terminal; and
   (b) access controller means (III), including
      (1) a plurality of data transmitting elements (100A) connected with the host computer and a plurality of data communication elements (150A) connected with said host modem means;
      (2) memory means for storing enquiry and reply sequences of bits;
      (3) means (150A-8, 16) for detecting at least one electronic message signal addressed to the host computer from said host modem means;
      (4) means (14, 150A-2) responsive to said electronic message signal for transmitting a bit sequence duplicating said enquiry sequence to said host modem means, said host modem means transmitting a subsequent sequence of signals in response to said bit sequence;
      (5) means (150A-3, 15) for comparing said subsequent sequence of signals with said reply bit sequence stored in said memory means;
      (6) means (17, 150A-30) for transmitting a disconnect signal to said host modem means;
      (7) means (12, 100A-8) for transmitting an authorized link establishing signal to the host computer; and
      (8) transfer path means operable for transmitting signals from the junction between said host modem means and said controller means to the input of the host computer and for transmitting signals from the output of the host computer to the junction between said host modem means and said controller means, said transfer path means being normally biased in the inoperable condition and being switched to the operable condition upon issuance of an authorized link established signal by said controller means, said disconnect signal transmitting means being operable upon the expiration of a predetermined time period during which no incoming signal is received following transmission of said bit sequence, said disconnect signal transmitting means further being operable when a discrepancy results in said comparing means, whereby when sequence agreement results from comparison of said subsequent sequence of signals and said reply bit sequence, said authorized link establishing signal is issued to switch said transfer path means to the operable condition.

2. Apparatus as defined in claim 1, wherein said access controller means further comprises a microcomputer (18), said microcomputer containing said memory means, said message signal detecting means, said bit sequence transmitting means, said comparing means, said disconnect signal transmitting means, said authorized link establishing signal transmitting means, and said transfer path means.

3. Apparatus as defined in claim 2, wherein said memory means comprises a read only memory.

* * * * *